United States Patent [19]

Walter

[11] 3,818,127

[45] June 18, 1974

[54] BASE LINE STABILIZING CIRCUIT FOR VIDEO INSPECTION MACHINE

[75] Inventor: William H. Walter, East Granby, Conn.

[73] Assignee: Emhart Corporation, Bloomfield, Conn.

[22] Filed: Jan. 31, 1973

[21] Appl. No.: 328,375

[52] U.S. Cl. ..... 178/6.8, 178/DIG. 26, 178/DIG. 37
[51] Int. Cl. .......... H04n 5/18, H04n 7/18
[58] Field of Search . 178/6.8, 7.1, DIG. 1, DIG. 26, 178/DIG. 37

[56] References Cited

UNITED STATES PATENTS

| | | | |
|---|---|---|---|
| 3,418,425 | 12/1968 | Thompson | 178/DIG. 26 |
| 3,526,710 | 9/1970 | Martin | 178/DIG. 26 |
| 3,598,907 | 8/1971 | Drinkuth | 178/DIG. 37 |
| 3,700,794 | 10/1972 | Loose | 178/7.1 |
| 3,748,382 | 7/1973 | Reitsma | 178/DIG. 26 |
| 3,751,586 | 8/1973 | Johansson | 178/DIG. 26 |

*Primary Examiner*—Howard W. Britton
*Attorney, Agent, or Firm*—McCormick, Paulding & Huber

[57] ABSTRACT

A liquid filled transparent container is spun momentarily, and successive video voltage patterns or frames are generated by a video camera while the liquid and any particles to be detected are still swirling, and the container is held stationary. Prior to digitizing the voltage peaks in each of these video frames so that they can be electronically compared one frame to another, the video output of the camera is processed to stabilize the pedestal or base voltage which represents the "black level" in the video voltage patterns representing the successive frames. The voltage peaks are then compared to a threshold voltage and digital voltage peaks generated whenever this threshold value is exceeded as measured with respect to the pedestal or base line voltage. Circuitry is described for continuously amplifying the video signal, for synchronously clamping it, and for stabilizing the present pedestal voltage by horizontally blanking the resulting signal, and by inverting and blanking the signal once again to achieve a low signal level which is then continuously fed back to the black level control for stabilizing the pedestal voltage at a level which does not vary within each scan line of each video frame as is characteristic of conventional video frame base line voltages.

5 Claims, 11 Drawing Figures

BASE LINE STABILIZING CIRCUIT FOR VIDEO INSPECTION MACHINE

BACKGROUND OF THE INVENTION

This invention relates to the inspection of liquid filled transparent containers by means of a video camera capable of generating several video voltage patterns, or frames. The containers are momentarily spun to cause the liquid, and any particles entrained in the liquid, to swirl in the stationary container. Means are provided for generating two or more of these video frames for comparison, and to produce an error signal whenever a moving particle is "seen" in different scan-line positions within these various video frames. U.S. Pat. No. 3,598,907, issued Aug. 10, 1971 to the assignee herein, shows such a machine and method, and that disclosure describes the basic concept upon which the present disclosure represents a significant improvement.

The basic approach described in the above-mentioned patent depends upon digitizing the video signal pattern or frame to provide a timed digital pulse to a synchronized memory device whenever the video voltage exceeds some predetermined threshold value. The sensitivity of this system is dictated by the value of this threshold voltage, which value ideally corresponds to a foreign particle above some predetermined size. Experience has shown that the video voltage varies within each frame and within each scan line of each such frame due perhaps to light intensity changes and/or to voltage drift. As a result of this fact, successive scan lines within a particular video frame do not necessarily produce identical digital pulse patterns when they should. That is, when the transparent container is stationary and the liquid contents are swirling but are free of foreign particles.

It has been found for example, that the pedestal or base line voltage for the video output of present day cameras has a tendency to vary within each scan line so that a particle of predetermined size may or may not be reflecting sufficient light into the camera to generate a peak in the video voltage pattern, which peak exceeds the threshold voltage value and in turn produces a digital pulse, depending upon the location of the particular particle on that particular scan line. For example, if the pedestal voltage were to deteriorate within a series of scan lines, then in such a case if a particle happens to be located adjacent to that edge of the container which is nearest to the starting point for that particular scan, the peak voltage may be sufficient to generate such a digital pulse, but on the other hand, if the particle is located adjacent that side of the container which is nearest to the opposite end of that particular scan line, such a digital pulse might not be produced when the particle is of such size as to reflect an equivalent quantity of light to the camera. This result will sometimes produce an error or reject signal in a system such as that described in U.S. Pat. No. 3,598,907 when the foreign particle is at one point in a video voltage pattern or frame, but not when the particle is at some other point in this or another frame.

The general object of the present invention is to provide an improved circuit for stabilizing the base line or pedestal voltage in each of these video voltage frames to assure that a reject signal is generated whenever a foreign particle above some predetermined undesirable size is present. Stated more specifically, the purpose of the present invention is to prevent variation of pedestal voltage, such as the deterioration of base line or pedestal voltages as mentioned above.

SUMMARY OF THE INVENTION

This invention deals generally with the inspection of liquid filled transparent containers by video techniques as described in U.S. Pat. No. 3,598,907 and deals more particularly with an improved circuit for stabilizing the base line voltage, with respect to which the video peak voltages are measured by reference to a predetermined threshold voltage, in order to generate digital voltage pulses for a memory device and an electronic comparator, which comparator then in turn provides an input to a reject device depending upon the results of such a comparison. The video camera is driven by timed means external to the camera and the comparator operates in synchonism therewith. Means is provided for synchronously clamping the video voltage patterns generated by the camera, and horizontal blanking means is provided for blanking the video voltage pattern to provide a video signal with a base level of substantially zero volts. A signal inverting means is provided for inverting the blanked video voltage signals to provide an inverted video signal, and peak detecting means operates after a second blanking step for this inverted video signal to provide a reference or "black level" signal which represents a stabilized base line voltage with respect to which the preset threshold voltage provides a constant reference. This "black level" signal is continuously fed back to the amplifier associated with the output from the video camera. Thus, instead of merely digitizing the output of the video camera in a concentional quantizer, the video output of the camera is processed prior to peak detection and prior to feeding the video signal to the quantizer for digitizing purposes. This processing of the video signal serves to reduce the presence of spurious voltage peaks, and to assure detecting peaks which do represent defects to be detected.

DETAILED DESCRIPTION OF PREFERRED EMBODIMENT

Figure 1:
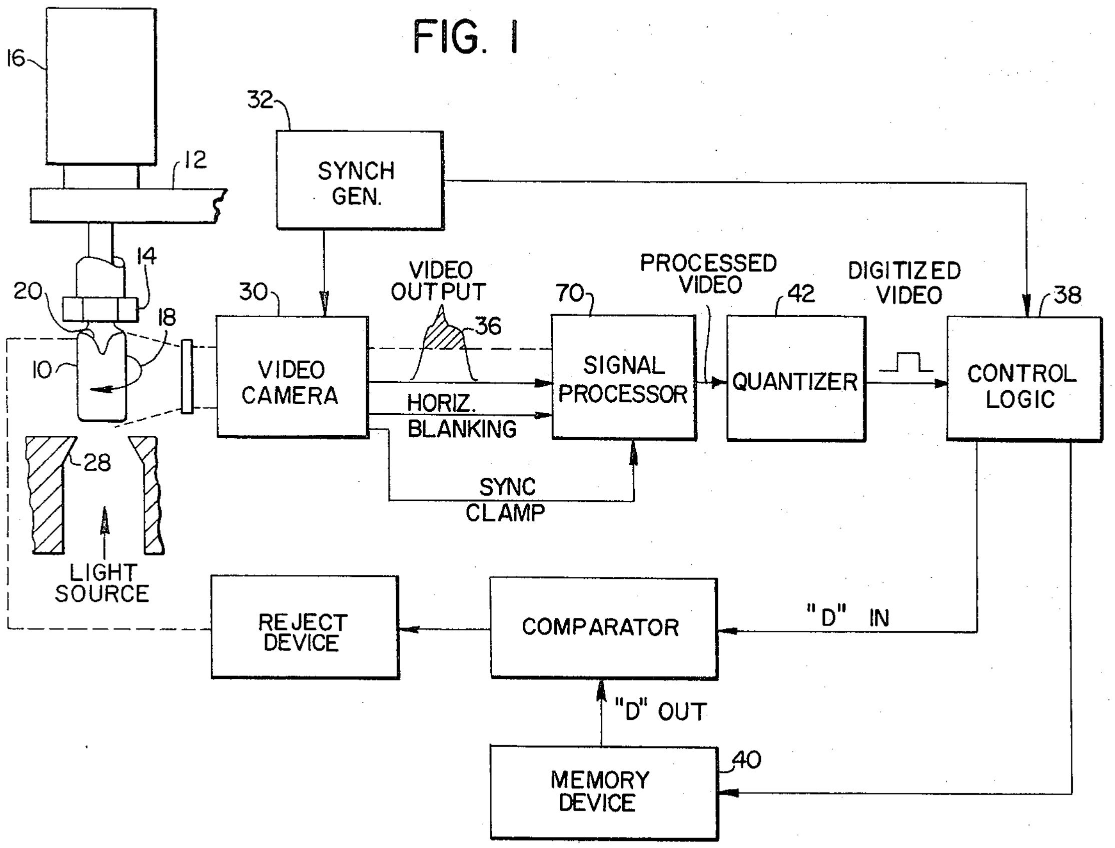
FIG. 1 is a schematic block diagram of the system shown and described in U.S. Pat. No. 3,598,907 with the insertion of a signal processor intermediate the output of the video camera and the quantizer, which quantizer produces a digitized video signal and is controlled by suitable logic circuitry to be ultimately fed to the comparator or the memory device.

Turning to the drawings in greater detail, FIG. 1 shows a liquid filled transparent container 10 which has been positioned at an inspection station by suitable article handling means, which means may include an intermittently driven turret 12, and a chuck 14, which chuck permits the container 10 to be spun on its vertical axis at least momentarily by a spin motor 16 in order to cause the liquid contents of the container to swirl as indicated generally by the arrow 18. Means is also provided for illuminating the transparent container from beneath by a light source which is preferably shielded as indicated generally at 28, and the source of light is preferably transmitted by a bundle of fiber optic elements connected at its opposite end to a conventional light source. The liquid contents will present a dark or black background for the video camera 30 in order to provide a contrast for any foreign particles in the liquid. As shown in FIG. 1, the container has been spun to a predetermined speed and then braked to a stop so that the liquid contents are swirling within the container creating a vortex 20 at the upper surface of the liquid as shown.

The video camera comprises a conventional component of the system and is adapted to produce a video output voltage 36 of conventional form. The camera is preferably driven in synchronism with other components of the system by a synch generator provided in the timing means 32. This timing means provides the vertical and horizontal drives necessary to operate the camera and said timing means also provides a signal to the control logic 38 so that other components of the system can be operated in timed relationship to the camera.

Figure 4:
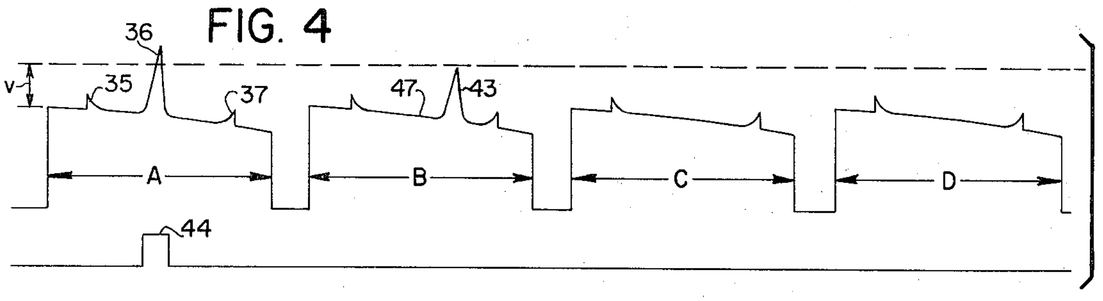
FIG. 4 shows schematically a portion of the video voltage pattern generated by the "picture" of FIG. 2, together with a representative digital trace of voltage pulses which might be expected to result from a preset threshold voltage V in the prior art system shown and described in U.S. Pat. No. 3,598,907.

The output of the video camera is processed by circuitry 70 to be described, and the video signal so processed is then fed to a quantizer 42 which serves to digitize the processed video signal to produce digital pulses, one of which is shown at 44 in FIG. 4. Each such pulse 44 corresponds to a peak voltage in the video output voltage of the camera, that is, when a voltage peak is detected which exceeds a preset threshold voltage, as indicated generally at V in FIG. 4. Such a preset threshold voltage is preferably preset by means of a conventional potentiometer (not shown) and the series of digital pulses are fed through a switching device, comprising a portion of the control logic 38, to a memory device which may comprise a delay line or other suitable device as indicated generally at 40. The quantizer 42 thus serves to provide a digital pulse for each peak voltage occurring in each of the scan lines of the various frames generated by the video camera 30 whenever the peak voltage exceeds the threshold voltage level set as described above.

Figure 2:
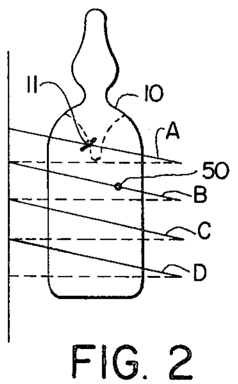
FIG. 2 is a schematic view of a first video voltage frame showing several scan lines and a liquid filled container with a stationary defect and with a foreign particle moving in the swirling liquid.

With particular reference to FIGS. 2 and 4, these views show respectively the image seen by the camera, and the video voltage trace as it might appear as the output from the video camera as indicated at 36 in FIG. 1. More particularly, a scratch or other stationary defect in the glass container 11 might be expected to produce a peak voltage 36 for example, which peak voltage does in fact exceed the preset threshold voltage V, and therefore when quantized, might be expected to produce a digital pulse 44. The video voltage pulses 35 and 37 also shown in FIG. 4 are generated as a result of the left and right-hand edges of the stationary glass container. Thus, each of the scan lines A, B, C and D correspond in FIG. 4 to the schematically indicated scan lines A, B, C and D of FIG. 2. A foreign particle is indicated generally at 50 in FIG. 2, and can be expected to also produce a peak voltage as indicated at 43 in scan line B.

It is important to note that the peak voltage generated by the foreign particle 50 does not exceed the threshold voltage V as a result primarily of the deterioration in the pedestal voltage 47 in scan line B. In fact, each of the scan lines of FIG. 4 can be seen to show a definite deterioration in pedestal voltage from an initial value with respect to which the threshold voltage V has some logical significance, to a deteriorated value which might conceivably be a significant portion of this threshold voltage V. Although some present day video cameras do exhibit this tendency for pedestal voltage deterioration, other variation can also be encountered. For example, time, temperature, and age of the video tube may cause other changes in pedestal voltage. It will be apparent that in a sensitive machine such as the present one for inspecting by video techniques, that this threshold voltage preset in the machine might well be minute enough to result in a apparent deterioration in performance of an inspection machine attempting to take advantage of the invention described and claimed in U.S. Pat. No. 3,598,907. It has been said that without a stable reference or base line from which to measure the threshold voltage V, that it is similar to using a precision mechanical height gauge that rests on a sponge. The signal processing device 70 to be described in greater detail hereinbelow seeks to eliminate this deficiency in the particular video inspection techniques utilized in a machine of this type.

Figure 3:
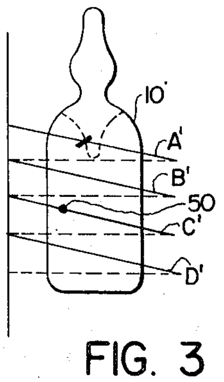
FIG. 3 is a schematic view similar to FIG. 2, but showing a second video voltage frame taken at a slightly later instant of time.
Figure 5:
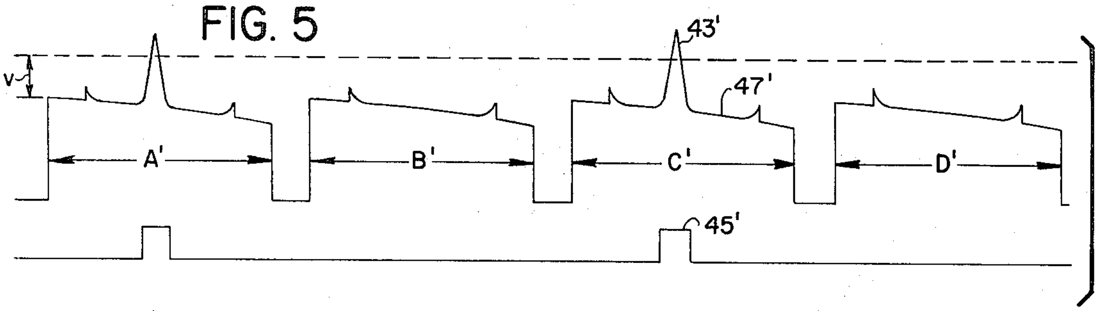
FIG. 5 is a schematic view similar to FIG. 4 showing the composite video voltage trace of the FIG. 3 "picture" and the associated digital trace of voltage pulses resulting from this same preset threshold voltage V as would be expected to result from the system shown and described in U.S. Pat. No. 3,598,907.

FIGS. 3 and 5 show, respectively, the image or picture seen by the camera, together with the resulting video voltage patterns representing each of the scan lines A', B', C' and D' at a slightly later instant of time than that shown in FIGS. 2 and 4. More particularly, the stationary defect in the glass container, indicated generally at 11 in FIG. 2, will remain in place, but the moving particle 50 can be expected to appear at a different scan line, for example C' in FIG. 5, as indicated generally by 43'. If this particle is of a marginal size, that is, if such a particle reflects a sufficient quantity of light to the camera so as to provide a video voltage peak which exceeds the threshold value V, the output from the quantizer will result in a digital voltage pulse 45' at this location. However, as a result of the deterioration in pedestal voltage 47' in this frame, the fact that the voltage peak 43' does happen to exceed the threshold voltage V can be attributed to happenstance only. Just as likely, and as illustrated with reference to FIG. 4 above, this peak voltage might well not rise to the preset threshold voltage value, resulting in an apparently acceptable container which container might well have particles of objectionable size.

Figure 4A:
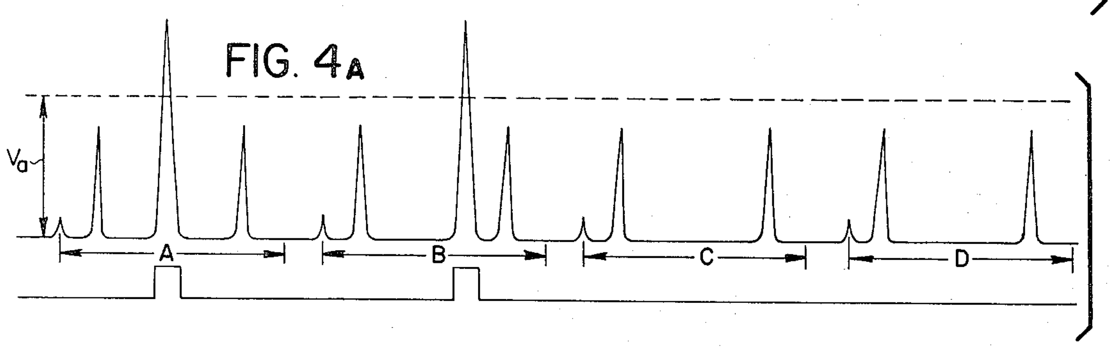
FIG. 4A shows schematically a processed video voltage pulse pattern corresponding to that of FIG. 4 but taking advantage of the base line stabilizing circuitry of the present invention.
Figure 5A:
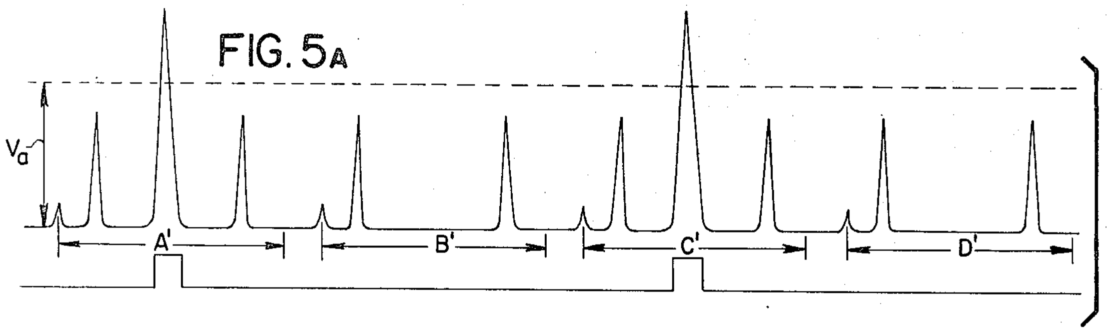
FIG. 5A is a schematic view similar to FIG. 4A showing the processed video voltage pattern corresponding to the FIG. 5 frame.
Figure 6:
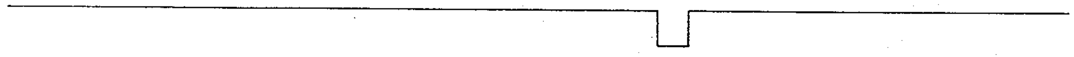
FIG. 6 shows the result of subtracting the digital voltage traces of FIGS. 4 and 5.
Figure 6A:
FIG. 6A shows the result of subtracting the digital voltage traces of FIGS. 4A and 5A.

The aim of the present invention is to stabilize the pedestal or base line voltage with respect to which the threshold voltage is set so as to eliminate the uncertainties referred to in the preceding paragraph. This is accomplished by not utilizing a threshold voltage V which is measured with reference to the unprocessed pedestal voltage as indicated in FIGS. 4 and 5, but instead reducing the video voltage pattern to the configuration shown schematically in FIGS. 4A and 5A with the result that the amplitude of the threshold voltage $V_a$ can be more meaningfully applied to detect peak voltages above this threshold value as measured from a stabilized base line.

Figure 7:
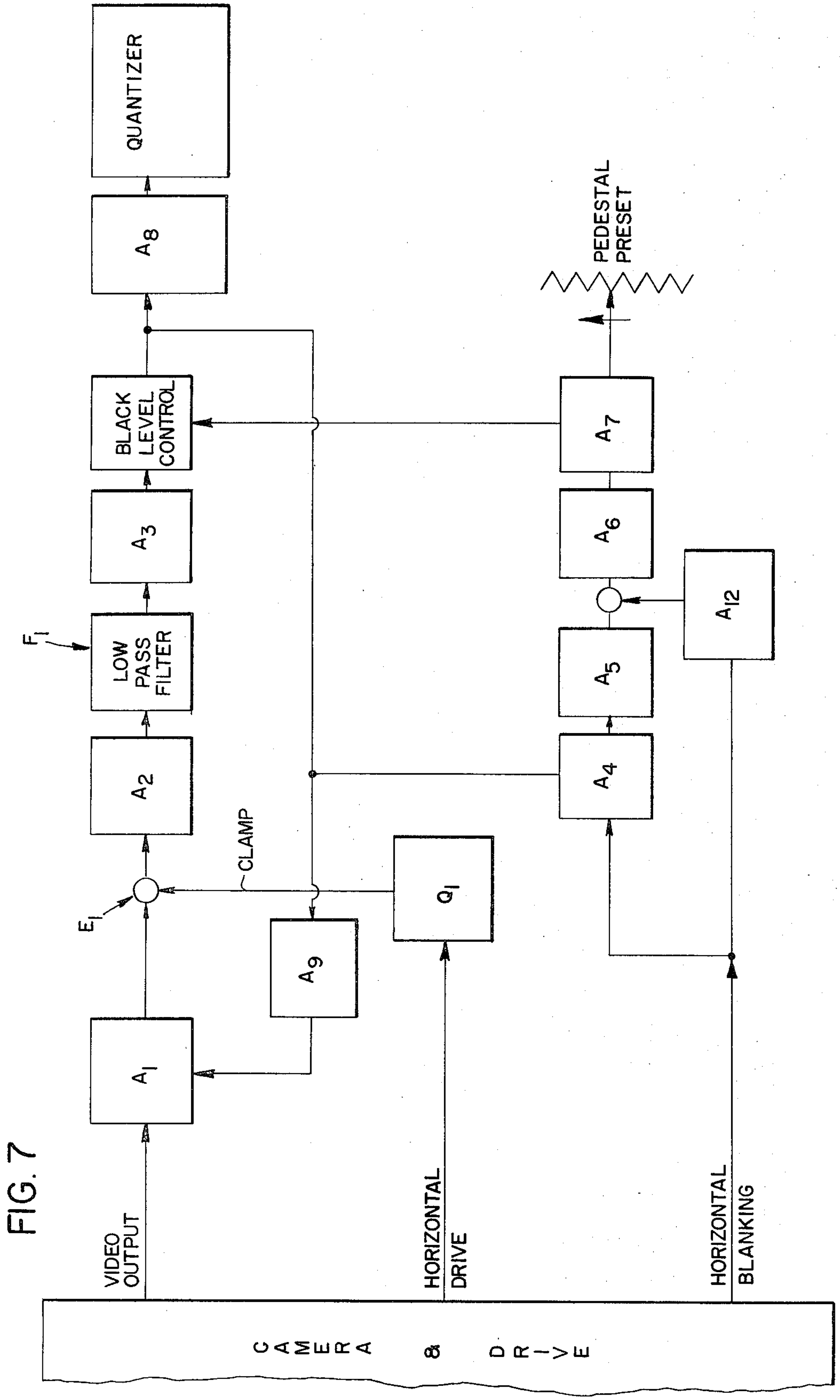
FIG. 7 is a schematic view of the feed-back loops which are included in the signal processing circuitry depicted even more schematically in FIG. 1 above.
Figure 8:
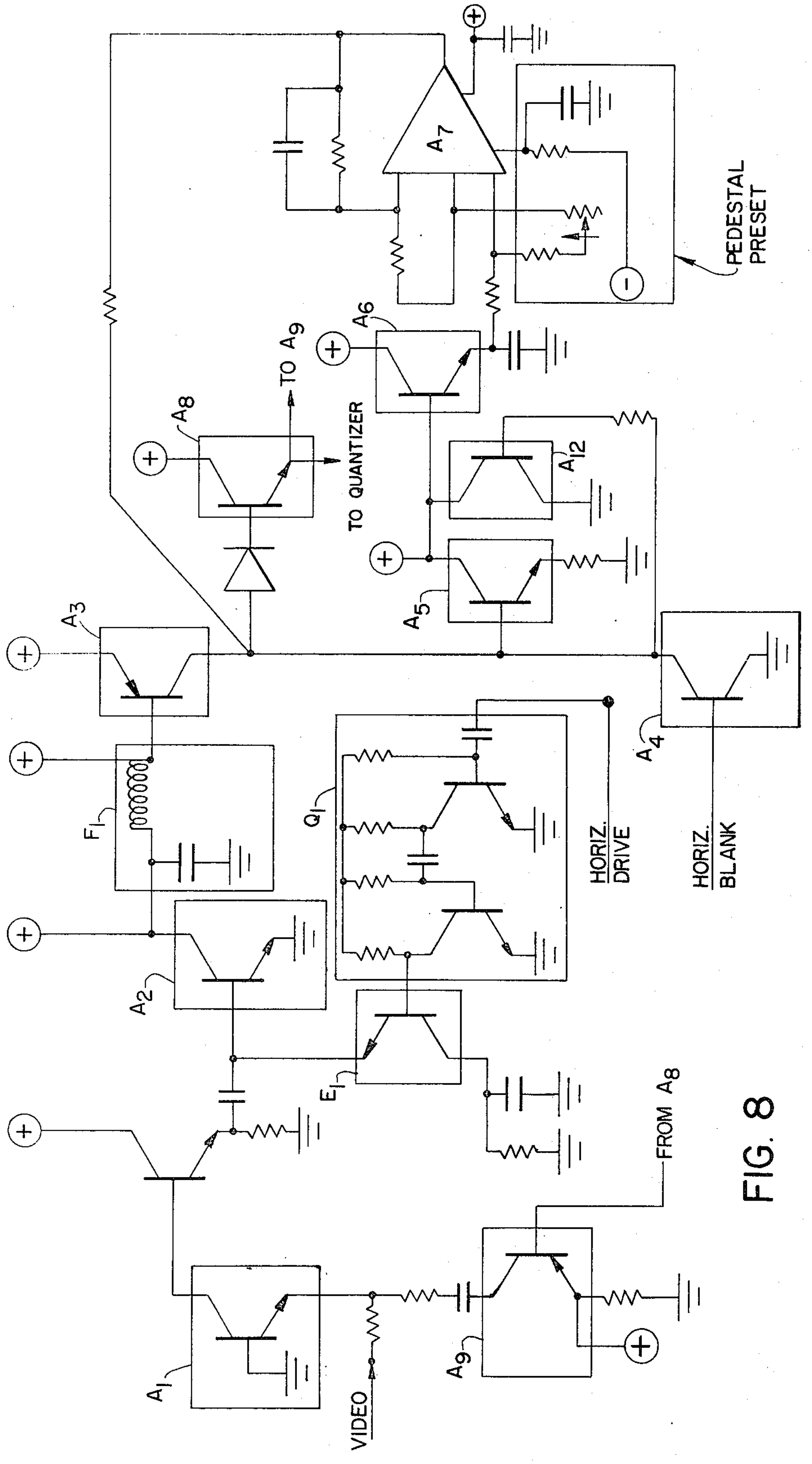
FIG. 8 is a somewhat more detailed schematic view similar to FIG. 7 showing the various components of FIG. 7 in somewhat greater detail.

Turning now to a more detailed description of the signal processor circuitry, FIG. 7 shows the video output 36 amplified several times by a grounded base amplifier $A_1$, best shown in FIG. 8. The collector output of this amplifier $A_1$ is then emitter-follower coupled to a grounded emitter amplifier $A_2$. The emitter-follower $E_1$ permits the output of amplifier $A_1$ to be clamped at a line rate frequency on the base of amplifier $A_2$. This clamping input to the base of emitter-follower $E_1$ is derived from the horizontal drive to the camera through circuits indicated generally at $Q_1$ in FIG. 8. These circuits place the horizontal clamping pulse in the desired point in each horizontal scan line.

In order to reduce unwanted noise in the system, a low pass filter $F_1$ is incorporated between the collector of amplifier $A_2$ and the base of a third amplifier $A_3$. The filtered video signal developed on the collector of amplifier $A_3$ is then blanked horizontally by a fourth amplifier $A_4$ to a level of zero. This horizontal blanking is derived from the camera's horizontal drive.

In order to effect automatic "black level" or pedestal control, the video signal is then inverted and blanked again. For this purpose, the collector of amplifier $A_4$ is fed to the base of an inverting amplifier $A_5$, the collector of which inverting amplifier $A_5$ undergoes a second blanking insertion by amplifier $A_{12}$. After such inversion and second blanking insertion the lowest "black level" is detected by peak detector amplifier $A_6$. The output of amplifier $A_6$ is filtered and then amplified by D.C. amplifier $A_7$, the output of which D.C. amplifier $A_7$ is then fed back to achieve the "black level" control desired for the base line or pedestal voltage. Thus, the video voltage output can be continuously compared to a reference voltage which is maintained at a constant level with the result that the processed video output can be emitter follower coupled by amplifier $A_8$ to be fed to the quantizer for digitizing the signal for operation of the system shown in FIG. 1.

A low frequency feedback loop is also provided in FIG. 7, and this feedback is amplified by amplifier $A_9$ to give the first amplifier $A_1$ a uniform video signal which will permit the threshold level (not shown) set in the comparator to be lowered as much as possible without being subject to interference from shading in a particular camera video output signal. Such shading is perhaps due to the non-uniform illumination of the container undergoing inspection, and may also be due to non-uniformity of the video camera system.

I claim:

1. In a machine for inspecting articles by use of a video camera capable of generating a series of video voltage patterns and including a memory device and a comparator for electronically comparing one such voltage pattern with another, the improvement comprising:

a timing means external to the camera for driving said camera both horizontally and vertically and in sychronism with the comparator, b clamping means for sychronously clamping the video voltage patterns generated by the camera, c blanking means for horizontally blanking the video voltage patterns to provide a video signal with a base level of "zero" volts, d inverting means for said blanked video voltage signal to provide an inverted video signal, e peak detecting means for said inverted video signal to provide a "black level" signal, and f a feedback loop for said "black level" signal to provide a stabilized base level for the video voltage patterns produced by the video camera.

2. The combination recited in claim 1 wherein second blanking means is provided for said inverted video signal prior to said peak detecting means for detecting the lowest black level peak.

3. The combination recited in claim 1 wherein amplifying means is provided for said video voltage patterns produced by said camera, and a low frequency feedback network associated with said amplifying means.

4. The combination recited in claim 1 wherein first amplifying means is provided for said video voltage patterns produced by said camera, said clamping means being coupled to said first amplifying means output by an emitter-follower, and second amplifying means for said clamped output of said first amplifying means.

5. The combination recited in claim 4 wherein a low pass filter network is provided for said second amplifying means output, and a third amplifying means associated with the output of said low pass filter network.

* * * * *

UNITED STATES PATENT OFFICE

CERTIFICATE OF CORRECTION

Patent No. 3,818,127 Dated June 18, 1974

Inventor(s) William H. Walter and Nikola V. Vidovic

It is certified that error appears in the above-identified patent and that said Letters Patent are hereby corrected as shown below:

Page 1, Col. 1, line 3, "Inventor: William H. Walter, East Granby, Conn." should read --Inventors: William H. Walter, East Granby, Conn.; and Nikola V. Vidovic, Sunnyvale, Calf.--

Page 1, Col. 2, line 13, "peaks" should be --pulses--.

Page 1, Col. 2, line 17, "present" should be --preset--.

Col. 1, line 11, "are" should be --is--.

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*